United States Patent Office.

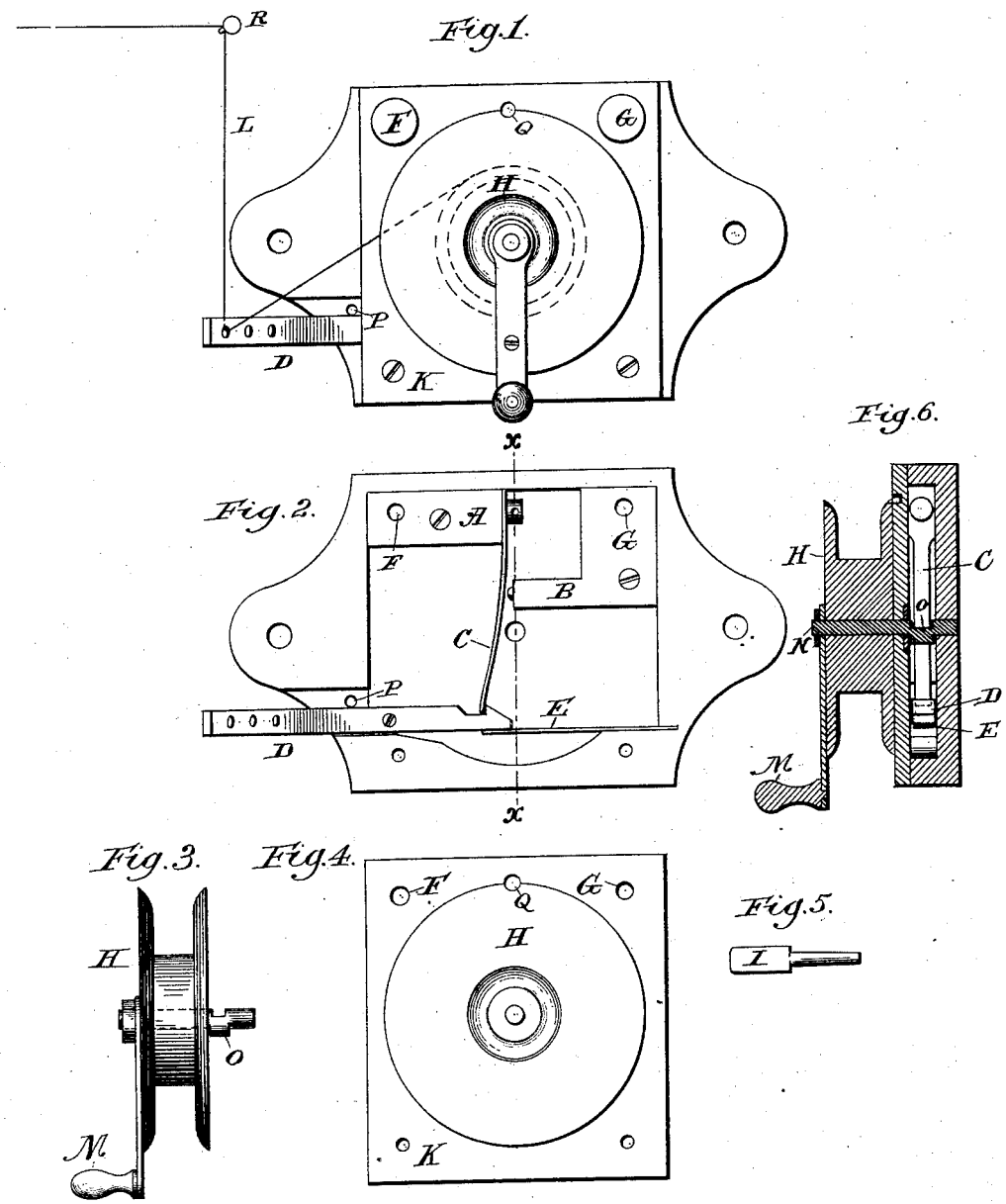

BENJAMIN F. HOUGH, OF SANDUSKY, OHIO.

BURGLAR-ALARM.

SPECIFICATION forming part of Letters Patent No. 367,523, dated August 2, 1887.

Application filed October 30, 1886. Serial No. 217,629. (No model.)

*To all whom it may concern:*

Be it known that I, BENJAMIN F. HOUGH, a citizen of the United States, residing at Sandusky, in the county of Erie and State of Ohio, have invented a new and useful Improvement in Burglar-Alarms, of which the following is a specification.

My invention relates to improvements in burglar-alarm and property-protecting machines in which there is a connection made between the property to be protected and the machine and an electrical battery in such a way that when the property is disturbed an electrical circuit is made through the machine and battery, and by means thereof an alarm is sounded; and the object of my improvement is to insure a connection between the machine and battery in such a simple and safe manner that the connection cannot get out of order. I attain this object by the mechanism illustrated in the accompanying drawings, in which—

Figure 1 is an elevation of the machine. Fig. 2 is a similar view of the machine, the reel and cover removed therefrom. Fig. 3 is a detailed view of the reel. Figs. 4 and 5 are detail views of the cover and detent-pin. Fig. 6 is an additional view showing the relation of the eccentric to the circuit-closing spring.

Similar letters refer to similar parts throughout the several views.

A is a solid brass plate secured to the base of the machine by means of screws. B is also a solid brass plate secured to the base of the machine by means of screws.

F and G are two separate binding-posts of the circuit.

C is a metallic spring attached to A, the left electrical connection, by means of a screw, and making a connection with the battery by coming in contact with platinum point on plate B.

D is a metallic lever made fast to the interior of the machine by means of an arbor, and extending outside of the machine.

E is a metallic spring which is connected with the body of the machine, and which forces lever D to make connection with spring C.

L is a cord or wire, one end of which is secured to the reel, the other end passing through one of the holes in lever D and through eyelet R, over the machine, and is attached to the object to be protected.

The action of these parts is as follows: To the property to be protected is attached one end of the cord L, and when the property is disturbed this cord L pulls lever D, which acts upon spring E, and this movement detaches spring C from the notch on the end of lever D, and spring C is thus allowed to make contact with platinum point on plate B, and thereby in this simple manner making a circuit through the battery and sounding the alarm.

H is the reel, and in Fig. 6 the relations of crank M, arbor N, and the eccentric O are shown, and the relation of the eccentric to the circuit-closing spring C is made manifest; and these four parts of the machine, H, M, N, and O, form virtually one body and work together. The purposes of the reel are various, and are shown as follows: First, the machine is set for use by turning the reel once around, or until a click is heard, then stop, leaving the handle of the crank M at the bottom of the center. The machine is now set for use and is clear of all connections with the circuit-closing device. Second, the reel, now free, can be used for unwinding or winding the cord or wire L without interfering with any of the interior parts of the machine. To illustrate, when the cord or wire L is attached to the thing to be protected and is passed through one of the eyes of lever D, and then attached to the reel, the tension of the cord or wire L can be changed at will by turning the reel, and, secondly, the wire or cord to extend from the machine to the objects to which they are attached may be concealed, if desired, and wound upon the reel, readily unwinding when required for use.

The reel can be used as an electrical switch or cut-off, as the current causing the alarm can be broken by the eccentric O by making one revolution of the reel, leaving the handle of the crank M at the bottom center. Thus the current is always broken when the instrument is set for use, and so remains until the property intended to be protected is disturbed, which disturbance closes the circuit and sounds the alarm.

Several cords or wires besides the stationary cord or wire attached to lever D can be used and applied to as many different objects or rooms, thus saving the expense of extra machines for different apartments. The same battery and alarm-bell can be utilized for an electrical door-bell without interfering with the other purposes of the machine.

The metallic pin I is used to fasten the reel after the cords have been adjusted for use, and this is done by removing pin I from the hole P over the lever D and inserting it in the hole Q in the reel and top plate, which hole will appear when the handle of the crank M is in the center of the bottom plate. This pin I is also used to prevent the machine from being thrown off (causing an unnecessary alarm) while placing the cords or wires or in winding up the reel, by placing pin I in hole P over lever D on the outside.

K is the top plate with reel attached.

I am aware that prior to my invention burglar-alarm or property-protecting machines have been made operating in conjunction with electrical batteries. I therefore do not claim such combination, broadly; but What I do claim as my invention, and desire to secure by Letters Patent, is—

The combination, in a burglar-alarm or property-protecting machine, of the reel H, the crank M, the arbor N, and the eccentric O, attached and used in connection with movable pin I, the base of the machine with pin-receiving holes P and Q, the detent-lever D, the pin I, the contact-spring C, and the plates A and B, for the various purposes specified, substantially as shown above.

BENJAMIN F. HOUGH.

Witnesses:
BENJAMIN F. LEE,
JOSEPH C. PIERCY.